US012556601B1

(12) United States Patent
Wei et al.

(10) Patent No.: US 12,556,601 B1
(45) Date of Patent: Feb. 17, 2026

(54) MULTI-CLOUD NETWORK TRAFFIC FILTERING SERVICE

(71) Applicant: AVIATRIX SYSTEMS, INC., Santa Clara, CA (US)

(72) Inventors: Xiaobo Sherry Wei, Palo Alto, CA (US); Lee-Chik Cheung, Santa Clara, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 24 days.

(21) Appl. No.: 17/397,990

(22) Filed: Aug. 10, 2021

Related U.S. Application Data

(60) Provisional application No. 63/218,869, filed on Jul. 6, 2021, provisional application No. 63/150,503, filed on Feb. 17, 2021.

(51) Int. Cl.
*H04L 67/10* (2022.01)
*H04L 9/40* (2022.01)
*H04L 12/66* (2006.01)

(52) U.S. Cl.
CPC .............. *H04L 67/10* (2013.01); *H04L 12/66* (2013.01); *H04L 63/0236* (2013.01)

(58) Field of Classification Search
CPC ...... H04L 67/10; H04L 12/66; H04L 63/0236
See application file for complete search history.

(56) References Cited

U.S. PATENT DOCUMENTS

| | | | | |
|---|---|---|---|---|
| 6,128,298 A | * | 10/2000 | Wootton | H04L 61/2514 370/392 |
| 7,756,929 B1 | * | 7/2010 | Pettigrew | H04L 51/212 709/224 |
| 7,764,692 B1 | | 7/2010 | Bhatnagar et al. | |
| 8,170,182 B2 | * | 5/2012 | Baker | H04L 63/06 379/88.19 |
| 8,839,417 B1 | * | 9/2014 | Jordan | H04L 63/0227 726/22 |
| 11,252,126 B1 | | 2/2022 | Thunga et al. | |
| 12,155,626 B1 | * | 11/2024 | Wei | H04L 63/0236 |

(Continued)

FOREIGN PATENT DOCUMENTS

| CN | 104426759 A | * 3/2015 | ......... H04L 12/6418 |
|---|---|---|---|
| CN | 105162608 A | * 12/2015 | ............... H04L 9/32 |

(Continued)

OTHER PUBLICATIONS

PCT/US2022/016201 filed Feb. 11, 2022 International Search Report and Written Opinion dated May 17, 2022.
(Continued)

*Primary Examiner* — Shean Tokuta
(74) *Attorney, Agent, or Firm* — Jackson Walker LLP

(57) ABSTRACT

In one embodiment, a computing platform featuring a controller and a first virtual private cloud network, which is communicatively coupled to the controller. The first virtual private cloud network includes at least a first gateway including egress filtering logic. The egress filtering logic is configured to (i) filter messages routed from the first gateway in accordance with a first set of filtering rules maintained by the first gateway and (ii) bypass the filtering of messages directed to or originating from one or more subnetworks in accordance with the first set of filtering rules.

10 Claims, 8 Drawing Sheets

(56) References Cited

U.S. PATENT DOCUMENTS

| | | | |
|---|---|---|---|
| 2004/0003086 A1* | 1/2004 | Parham | H04L 61/4552 |
| | | | 707/999.01 |
| 2004/0187033 A1* | 9/2004 | Wang | H04L 63/0209 |
| | | | 726/13 |
| 2005/0169274 A1* | 8/2005 | Shuster | H04L 63/0236 |
| | | | 370/392 |
| 2008/0168558 A1* | 7/2008 | Kratzer | G06F 21/55 |
| | | | 726/23 |
| 2010/0036947 A1* | 2/2010 | Krishnamurthy | H04L 51/212 |
| | | | 709/225 |
| 2011/0103372 A1* | 5/2011 | Shatsky | H04L 65/1045 |
| | | | 370/352 |
| 2011/0103373 A1* | 5/2011 | Shatsky | H04L 65/1016 |
| | | | 370/352 |
| 2013/0238728 A1* | 9/2013 | Fleck | G06Q 10/10 |
| | | | 709/206 |
| 2013/0332195 A1* | 12/2013 | Galuten | G16H 50/70 |
| | | | 705/3 |
| 2014/0122727 A1* | 5/2014 | Miner | H04L 45/60 |
| | | | 709/227 |
| 2015/0043379 A1* | 2/2015 | Shimokuni | H04L 45/586 |
| | | | 370/254 |
| 2015/0071298 A1* | 3/2015 | Combs | H04L 49/70 |
| | | | 370/409 |
| 2015/0131664 A1* | 5/2015 | Page | H04L 61/2521 |
| | | | 370/392 |
| 2015/0242256 A1* | 8/2015 | Morrissey | H04L 67/02 |
| | | | 709/219 |
| 2016/0014082 A1 | 1/2016 | Bharali et al. | |
| 2017/0017722 A1* | 1/2017 | Henderson | G06N 20/00 |
| 2017/0147945 A1* | 5/2017 | Henderson | G06Q 10/067 |
| 2017/0257439 A1* | 9/2017 | Wang | H04L 67/146 |
| 2018/0007002 A1 | 1/2018 | Landgraf | |
| 2018/0159856 A1 | 6/2018 | Gujarathi | |
| 2019/0020666 A1 | 1/2019 | Leung et al. | |
| 2019/0173909 A1* | 6/2019 | Mixer | H04L 41/082 |
| 2019/0238508 A1 | 8/2019 | Hira et al. | |
| 2019/0394219 A1* | 12/2019 | Huang | H04L 63/1425 |
| 2020/0059492 A1 | 2/2020 | Janakiraman et al. | |
| 2020/0259793 A1* | 8/2020 | Pangeni | H04L 63/0254 |
| 2020/0267176 A1* | 8/2020 | Asher | H04L 63/0263 |
| 2020/0280587 A1 | 9/2020 | Janakiraman et al. | |
| 2020/0287888 A1 | 9/2020 | Moore et al. | |
| 2020/0382345 A1 | 12/2020 | Zhao et al. | |
| 2021/0014198 A1* | 1/2021 | Amoudi | H04L 63/0236 |
| 2021/0127268 A1* | 4/2021 | Franyie Quintana | |
| | | | H04W 12/60 |
| 2021/0136869 A1* | 5/2021 | Radmand | H04W 84/18 |
| 2021/0168032 A1* | 6/2021 | Miller | H04L 41/0895 |
| 2021/0203639 A1* | 7/2021 | Takajo | H04L 63/0272 |
| 2021/0203710 A1* | 7/2021 | Burnette | H04L 65/80 |
| 2021/0329534 A1* | 10/2021 | Szrom | H04W 48/04 |
| 2025/0088485 A1* | 3/2025 | Wei | H04L 12/4641 |

FOREIGN PATENT DOCUMENTS

| | | | | |
|---|---|---|---|---|
| CN | 106790170 A | * | 5/2017 | H04L 63/0245 |
| CN | 117178537 A | * | 12/2023 | |
| CN | 117223250 A | * | 12/2023 | |
| EP | 2009858 A1 | * | 12/2008 | H04L 51/212 |
| EP | 2019527 B1 | * | 2/2012 | H04L 51/234 |
| EP | 3334129 A1 | * | 6/2018 | H04L 61/5076 |
| GB | 2551792 A | * | 1/2018 | H04L 67/1036 |
| JP | 4035683 B2 | * | 1/2008 | |
| KR | 20190074002 A | * | 6/2019 | H04L 63/166 |
| RU | 2378692 C2 | * | 1/2010 | G06Q 50/60 |
| WO | WO-2015194604 A1 | * | 12/2015 | H04L 63/1425 |
| WO | WO-2017219891 A1 | * | 12/2017 | H04L 12/141 |

OTHER PUBLICATIONS

PCT/US2022/016111 filed Feb. 11, 2022, International Search Report and Written Opinion dated Jun. 3, 2022.

* cited by examiner

MULTI-CLOUD NETWORK TRAFFIC FILTERING SERVICE

CROSS-REFERENCE TO RELATED APPLICATIONS

This application claims the benefit of priority on U.S. Provisional Patent Application No. 63/150,503 filed Feb. 17, 2021 and U.S. Provisional Patent Application No. 63/218,869 filed Jul. 6, 2021, the entire contents of both of which are incorporated by reference herein.

FIELD

Embodiments of the disclosure relate to the field of networking. More specifically, one embodiment of the disclosure relates to a multi-cloud, network traffic filtering service.

GENERAL BACKGROUND

Over the past few years, cloud computing has provided an Infrastructure as a Service (IaaS), where resources are provided as part of a cloud computing platform (e.g., public cloud network) and made accessible to tenants as a service. One of these services allows tenants to run software instances residing within the cloud computing platform. This migration of software functionality into cloud computing platforms has led to greater usage of virtual networks such as virtual private cloud networks for different public cloud providers such as AMAZON® Web Services (AWS), MICROSOFT® AZURE® Cloud Services, Google® Cloud Services, ORACLE® Cloud Services, or the like.

In general, a virtual private cloud network is an on-demand, configurable pool of shared resources, which are allocated within the cloud computing platform and provide a certain level of isolation between the different organizations or other entities (hereinafter, "users") using the cloud resources. Using the infrastructure of a public cloud network of a multi-cloud computing platform, each virtual private cloud network may operate as a "spoke" virtual private network (e.g., a first plurality of virtual network components that provide ingress/egress communications with cloud resources such as cloud-based software instances) or as a "transit" virtual private network (e.g., a second plurality of virtual network components that support the routing of messages with the same or different public cloud networks).

Cloud-based software instances with unrestricted access to the Internet-based services is problematic as it exposes the network to attack. Native cloud constructs, such as Internet of Network Address Translation (NAT) gateways for example, perform filtering based on Internet Protocol (IP) address, not domains. Fully Qualified Domain Name (FQDN) filtering, if deployed, can mitigate the probability of a successful attack, given that the cloud-based software instances may be limited to communicate with only certain, known Internet-based services. However, this "white list" filtering of communications is highly subject to failure and circumvention without a centralized filtering policy scheme that provides visibility and is modifiable with bypass conditions.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
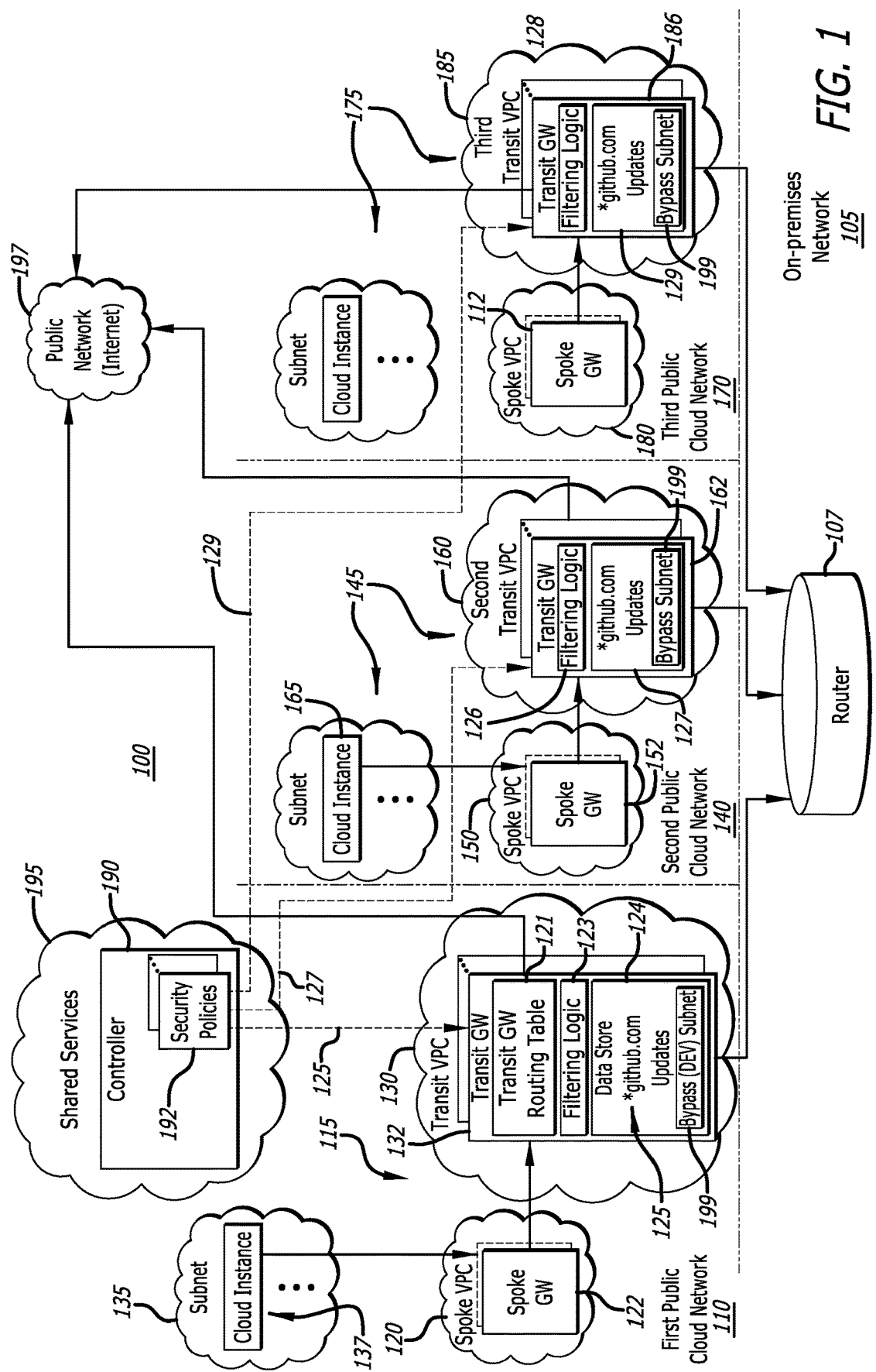
FIG. 1 is an exemplary embodiment of a multi-cloud computing platform implemented with different filtering components that restrict certain types of egress data traffic.

Embodiments of a system and method for establishing a multi-cloud, network traffic filtering service, which is configured to deliver centralized control over Internet-bound traffic from virtual networking infrastructures using a domain filtering scheme, such as Fully Qualified Domain Name (FQDN) filtering. The network traffic filtering service satisfies organizational and regulatory compliance initiatives for restricting outbound traffic to the Internet, such as Payment Card Industry (PCI), Health Insurance Portability and Accountability Act (HIPAA) for example, while eliminating the complexity of manually creating filtering rules at a software instance level using constantly changing IP address lists. Also, this network traffic filtering service delivers enterprise-class visibility, centralized control, and multi-cloud optionality not available from native cloud services or open source proxy software.

As described below, the network traffic filtering service is implemented as logic within one or more gateways partially forming a virtual networking infrastructure within a multi-cloud computing platform. In particular, in certain deployments (e.g., AWS deployment), the virtual networking infrastructure is referred to as a virtual private cloud network (VPC), while in other deployments (Azure® deployment), the virtual networking infrastructure is referred to as a virtual network (VNet). For ease and consistency, herein, we shall refer to all types of these virtual networking infrastructures as a "virtual private cloud network" or "VPC."

According to one embodiment of the disclosure, the multi-cloud computing platform may feature (i) a first plurality of cloud-based, virtual networking infrastructures each operating as a virtual private cloud network (VPC) that maintains cloud resources accessible by a set of gateways (hereinafter, "spoke VPCs"), and/or (ii) a second plurality of cloud-based virtual networking infrastructures operating as a VPC that supports the routing of messages from/to the spoke VPCs or an on-premises network (hereinafter, "transit VPCs"). Additionally, the multi-cloud computing platform features a shared services networking infrastructure, which includes a controller for updating and maintaining data stores for spoke VPCs and/or transit VPCs to maintain routing information and/or egress filtering rules, as described below. The multi-cloud computing platform may be implemented as part of a single public cloud network or as part of a multiple public cloud network.

More specifically, according to one embodiment of the disclosure, each spoke VPC includes a set of gateways (hereinafter, "spoke gateways"), which are communicatively coupled to one or more cloud software instances with a particular subnetwork (subnet) or particular subnets. Some or all of these cloud software instances may include executable applications. Similarly, each transit VPC may feature a gateway cluster including a set (e.g., two or more) gateways. The set of gateways deployed within the transit VPC (hereinafter, "transit gateways") are configured to control the routing of messages between spoke VPCs, and in effect, filter and control the routing of messages between cloud software instances deployed in different spoke VPCs. Besides communicatively coupled to spoke gateways, the transit gateways may be communicatively coupled to one or more network edge devices (e.g., virtual or physical routers, etc.) deployed within an on-premises network (hereinafter, "on-prem network devices").

Figure 5:
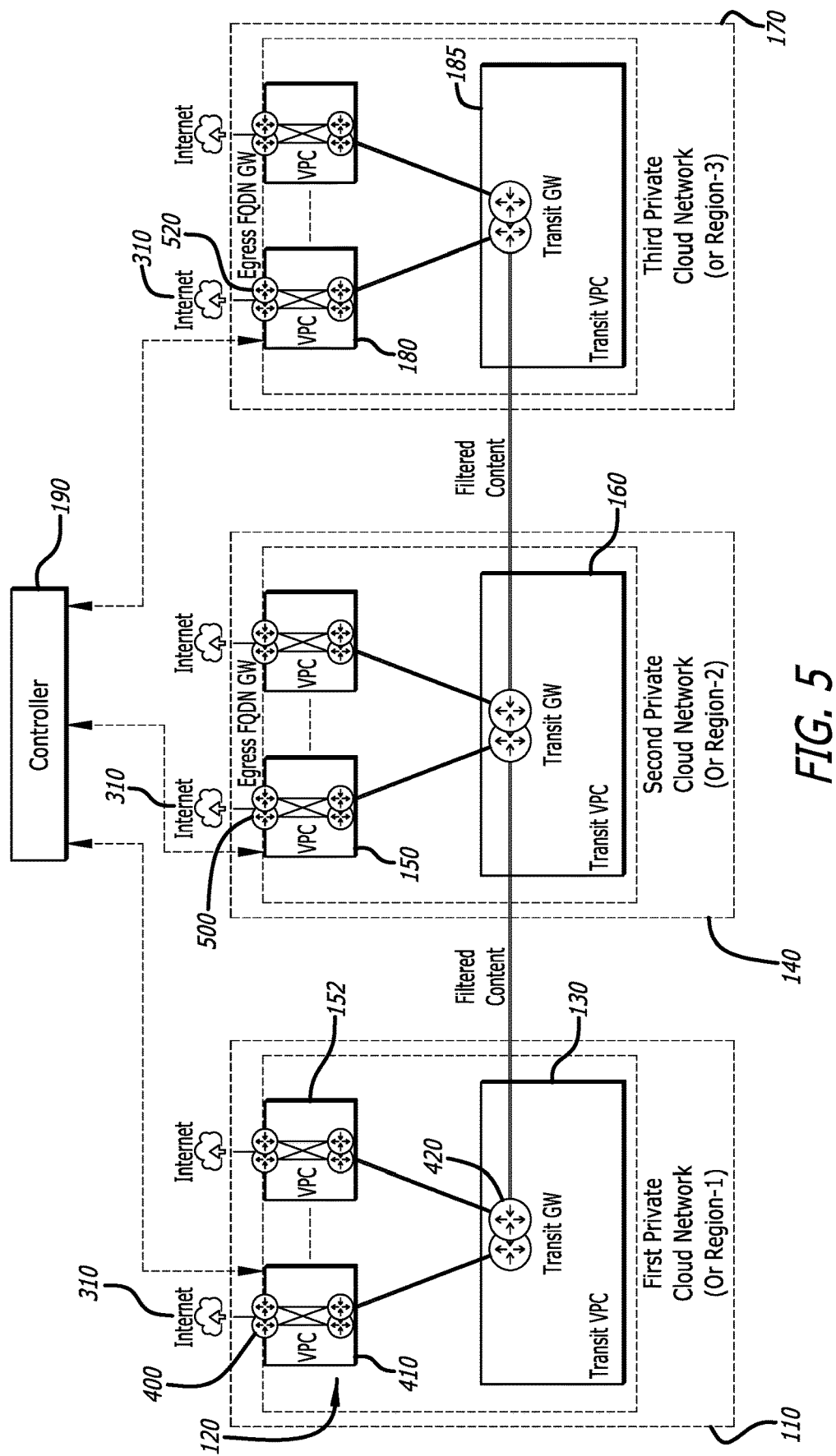
FIG. 5 is an exemplary embodiment of the multi-cloud computing platform deployment with the local egress filtering components of FIG. 4.
Figure 6:
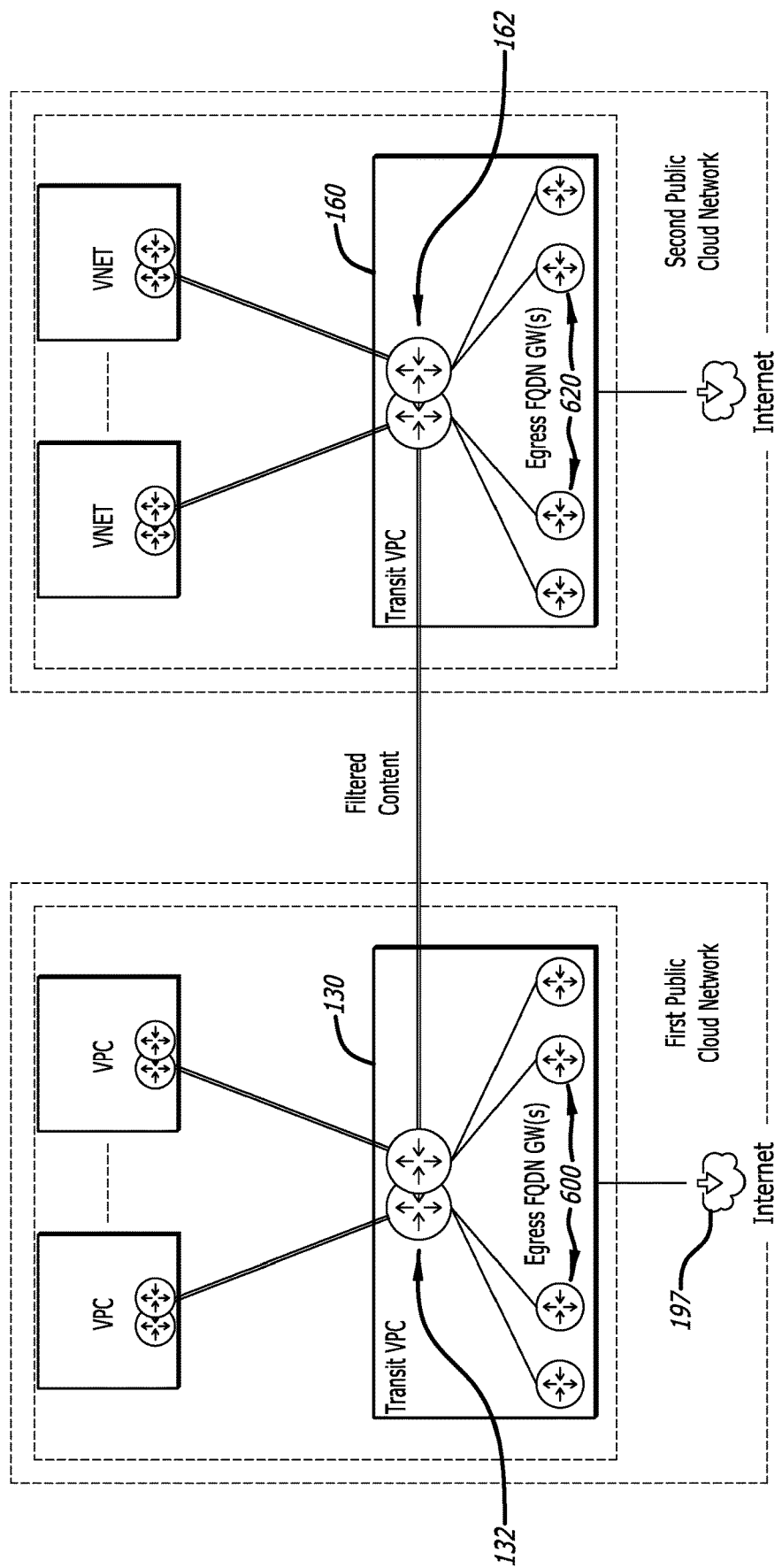
FIG. 6 is a first exemplary embodiment of centralized egress filtering components that support the multi-cloud computing platform of FIG. 1.
Figure 7:
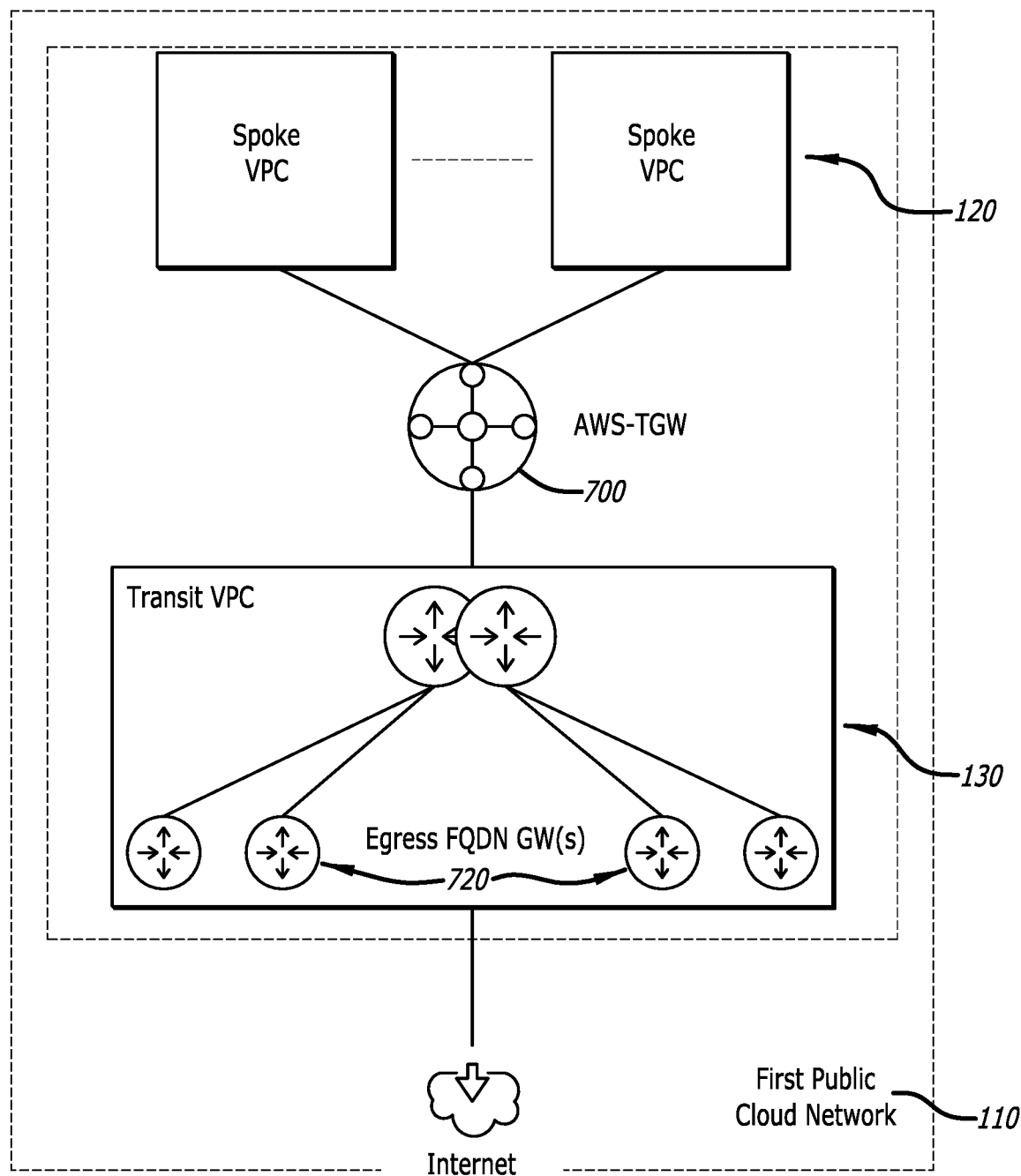
FIG. 7 is a second exemplary embodiment of centralized egress filtering components that support the multi-cloud computing platform of FIG. 1.

In particular, egress filtering logic may be deployed within the spoke or transit gateways to provide local egress filtering (see FIGS. 3-5) or the centralized egress filtering (see FIGS. 6-7). The egress filtering may be in accordance with FQDN filtering scheme, which filters any Transmission Control Protocol (TCP) and User Datagram Protocol (UDP) traffic, including Hypertext Transfer Protocol (HTTP), HTTP Secure (HTTPS) and Secure File Transfer Protocol (SFTP) traffic. The FQDN filtering logic may be configured with (i) a whitelist (i.e., only the destination host names specified in a list are permitted to pass and drop all other destinations), (ii) a blacklist (i.e., only the destination host names specified in a list are filtered and precluded from further transmission within the multi-cloud computing platform, and/or (iii) a combination of both a whitelist and a blacklist. Each destination identified in the whitelist or blacklist is specified as a fully qualified domain name. As a result, the FQDN filtering logic includes filter rules that rely on content within the whitelist and/or blacklist to provide visibility and control for network traffic leaving the VPCs.

It is contemplated that the FQDN filtering logic may include a subnet pass-through function, which allows for messages associated with one or more selected subnets in the VPC to bypass any FQDN filtering rules. For example, one subnet may be utilized by developers (DEV subnet), and if identified as a subnet bypass, messages to or from (to/from) gateways associated with the DEV subnet are not subject to FQDN filtering. The controller within a shared virtual networking infrastructure is responsible for updating and maintaining the FQDN filtering rules and subnet bypass rules, as described below.

I. Terminology

In the following description, certain terminology is used to describe features of the invention. In certain situations, each of the terms "logic" and "component" is representative of hardware, software or a combination thereof, which is configured to perform one or more functions. As hardware, the logic (or component) may include circuitry having data processing or storage functionality. Examples of such circuitry may include, but are not limited or restricted to a processor (e.g., microprocessor, one or more processor cores, a programmable gate array, a microcontroller, an application specific integrated circuit, etc.), semiconductor memory, or combinatorial logic.

Alternatively, or in combination with the hardware circuitry described above, the logic (or component) may be software in the form of one or more software modules. The software module(s) may be configured to operate as a virtual hardware component (e.g., virtual processor) or a virtual network device including one or more virtual hardware components. The software module(s) may include, but are not limited or restricted to an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device.

Controller: The controller manages operability of the multi-cloud network platform by leveraging centralized intelligence acquired based on access and knowledge of content within routing tables utilized by each gateway. The controller maintains egress filtering policies that may be unique to each gateway, where the filter rules associated with each of these filtering policies are maintained to dynamically program both native cloud network constructs and gateways within a region of a public cloud network, within different regions of the public cloud network, or within different public cloud networks.

Gateway: This term may be construed as a virtual or physical logic with data routing functionality. As an illustrative example, the gateway may correspond to virtual logic, such as a data routing software component that is assigned an Internet Protocol (IP) address within an IP address range associated with a VPC including the gateway and provides distributed filtering services, based on policies (e.g., whitelist, blacklist, IP addresses, etc.) to limit VPC egress traffic to known domain names or domain paths with "wild card" support (e.g., use of wild cards such as "*" symbol to identify all delimiters that occur before and/or after that symbol). Multiple gateways are deployed in a multi-cloud computing platform, which may control the ingress/egress of data traffic into/from a VPC. While having similar architectures, the gateways may be identified differently based on their location/operability within a public cloud network. For example, a "spoke" gateway is a gateway that supports routing between cloud software instances and "transit" gateways, where each transit gateways is configured to further assist in the propagation of data traffic (e.g., one or more messages) from one spoke gateway to another spoke gateway within the same spoke VPC or within different VPCs. Alternatively, in some embodiments, the gateway may correspond to physical logic, such as an electronic device that is communicatively coupled to the network and assigned the hardware (MAC) address and IP address.

IPSec tunnels: Secure peer-to-peer communication links established between gateways of neighboring virtual network components such as neighboring VPCs. The peer-to-peer communication links are secured through a secure network protocol suite referred to as "Internet Protocol Security" (IPSec). These IPSec tunnels are represented in gateways by virtual tunnel interface (VTI) and the tunnel states are represented by VTI states.

Computerized: This term generally represents that any corresponding operations are conducted by hardware in combination with software.

Message: Information in a prescribed format and transmitted in accordance with a suitable delivery protocol. Hence, each message may be in the form of one or more packets, frames, or any other series of bits having the prescribed format.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General System Architecture

Referring now to FIG. 1, an exemplary embodiment of a multi-cloud computing platform 100 is shown. The multi-cloud computing platform 100 is configured to provide connectivity between resources 115 of a first public cloud network 110 and resources of one or more other public cloud networks, such as resources 145 of a second public cloud network 140 and resources 175 of a third public cloud network 170 for example. Herein, according to one embodiment of the disclosure, the first public cloud network 110 may correspond to an AMAZON® WEB SERVICES (AWS) cloud network, while the second public cloud network 140 may correspond to a GOOGLE® cloud network and the third public cloud network 170 may correspond to a MICROSOFT® AZURE® cloud network.

According to one embodiment of the disclosure, the resources 115 of the first public cloud network 110 may include one or more spoke VPCs, one or more transit VPCs, and one or more subnetworks (subnets) to maintain cloud software instances. More specifically, as shown, the spoke VPC(s) may feature at least a first spoke VPC 120. The first spoke VPC 120 is communicatively coupled to at least a first transit VPC 130, which includes a set (e.g., two or more) of (transit) gateways 132. Similarly, the first spoke VPC 120 features a set of (spoke) gateways 122, each of which may be configured to be communicatively coupled to (i) some of the cloud software (application) instances 137 within a subnet 135 and (ii) the transit gateway(s) 132 of the first transit VPC 130. A network edge device 107 (e.g. virtual or physical router) for an on-premises network 105 may be communicatively coupled to the transit gateway(s) 132 for the transmission of filtered data traffic to and receipt of data traffic for filtering from the on-premises network 105.

Herein, according to one embodiment of the disclosure, the first transit VPC 130 is configured, in accordance with a first transit routing table 121 managed by a controller 190 within a shared services VPC 195, to exchange data traffic from certain cloud appliance instance(s) 137 using a selected spoke gateway from the set of spoke gateways 122 maintained in the first spoke VPC 120. Besides the first transit routing table 121, according to one embodiment of the disclosure, the first transit VPC 130 may further include filtering logic 123 and a data store 124 to maintain filter rules 125 provided from the controller 190. These filter rules 125 are based on centralized security (egress filtering) policies 192, which may uniquely pertain to each spoke and/or transit gateway that is implemented with filtering logic to control egress data traffic from the first public cloud network 110.

Alternatively, although not shown, the filtering logic 123 (along with the filtering rules 125 stored within the data store 124) may be deployed within the first spoke VPC 120. For this embodiment, the filter rules 125 would pertain to a portion of the centralized security (egress filtering) policies 192 that uniquely pertain to each of the spoke gateways 122 implemented with the filtering logic 123 to control egress data traffic from the first public cloud network 110, especially data traffic directed to the network edge device 107 (e.g. virtual or physical router) for the on-premises network 105 or a publicly available network 197 such as the Internet.

As further shown in FIG. 1, the resources 145 of the second public cloud network 140 may feature at least a second spoke VPC 150, which are communicatively coupled to a second transit VPC 160 including one or more transit gateways 162. The second spoke VPC 150 features a set of spoke gateways 152, which may be configured with connectivity to some of cloud software (application) instances 165 and the transit gateway(s) 162 of the second transit VPC 160. Deploying the same general architecture as the first public cloud network 110, filtering logic 126 may be deployed within the second transit VPC 160 as shown (or the second spoke VPC 150) to operate, in accordance with filter rules 127 provided by the controller 190, to monitor, and in some cases restrict, egress data traffic from the second public cloud network 140. Hence, filtered data content is provided as the egress data traffic to the Internet 197 or the on-premises network 105.

As also shown in FIG. 1, the resources 175 of the third public cloud network 170 may feature at least a third spoke VPC 180, which are communicatively coupled to a third transit VPC 185 including one or more transit gateways 186. The third spoke VPC 180 features a set of spoke gateways 182, which may be configured with connectivity to some of cloud software (application) instances 183. The third transit VPC 185 features a set of transit gateways 186. Deploying the same general architecture as the public cloud networks 110 and 140, filtering logic 128 may be deployed within the third transit VPC 185 as shown (or the third spoke VPC 180) to operate, in accordance with filter rules 129 provided by the controller 190, to monitor, and in some cases restrict, egress data traffic from the third public cloud network 170. As shown, filtered data content is provided as the egress data traffic to the Internet 197 or the on-premises network 105.

In general, the gateways deployed within the different VPCs are configured to deliver advanced cloud networking and security services. Herein, according to one embodiment of the disclosure, some or all of the gateways 122 and/or 152 and/or 182 (hereinafter, 122/152/182) and/or gateways 132/162/186 may be deployed to provide distributed filtering services, based on policies (e.g., FQDN whitelists or IP addresses) to limit VPC egress traffic to known domain names or domain paths with wild card support. Herein, according to one embodiment of the disclosure, the egress FQDN gateways 132/162/186 replace native network address translation (NAT) gateways and provide high throughput with limited compute requirements. Moreover, these gateways 132/162/186 are primarily deployed to deliver transit network and security services such as intelligent dynamic routing, active-active network high-availability, end-to-end and high-performance encryption and collect operational visibility data. Egress FQDN gateways can also operate as spoke gateways 122/152/182 to deliver these services, but may require higher-performance underlying cloud compute capacity More specifically, the filtering logic 123, 126 and/or 128 may be configured to filter egress data traffic prior to transmission from the VPCs associated with a corresponding public cloud network 110, 140 and/or 170. This filtering allows for restriction of content within egress data traffic to ensure compliance with industrial, regional or governmental regulations (e.g., PCI, HIPPA, etc.). According to one embodiment of the disclosure, the egress filtering may correspond to Fully Qualified Domain Name (FQDN) filtering scheme, which filters any Transmission Control Protocol (TCP) and User Datagram Protocol (UDP) traffic, including Hypertext Transfer Protocol (HTTP), HTTP Secure (HTTPS) and Secure File Transfer Protocol (SFTP) traffic. The FQDN filtering may be conducted by the filtering logic 123, 126 and/or 128 based on filter rules 125, 127 and/or 129, respectively. The filter rules 125, 127 and/or 129 may be provided as part of (i) a whitelist (i.e., only the destination host names specified in a list are permitted to pass and drop all other destinations) and/or (ii) a blacklist (i.e., only the destination host names specified in a list are filtered and precluded from further transmission within the multi-cloud computing platform. Each destination identified in the whitelist and/or blacklist is specified as a fully qualified domain name.

It is contemplated that the filter rules 125, 127 and/or 129 may include a subnet pass-through rule 199, which allows for content sourced by or destined to one or more identified subnet(s) pertaining to that public cloud network to bypass other FQDN filtering rules. For example, one subnet may be utilized by developers (DEV subnet, such as subnet 135), and if identified as a subnet bypass, messages to/from gateways associated with the DEV subnet 135 are not subject to FQDN filtering. The controller 190 within the shared services networking infrastructure is responsible for updating and maintaining the FQDN filtering rules 125, 127 and/or 129 along with corresponding subnet bypass rules 199.

Figure 2:
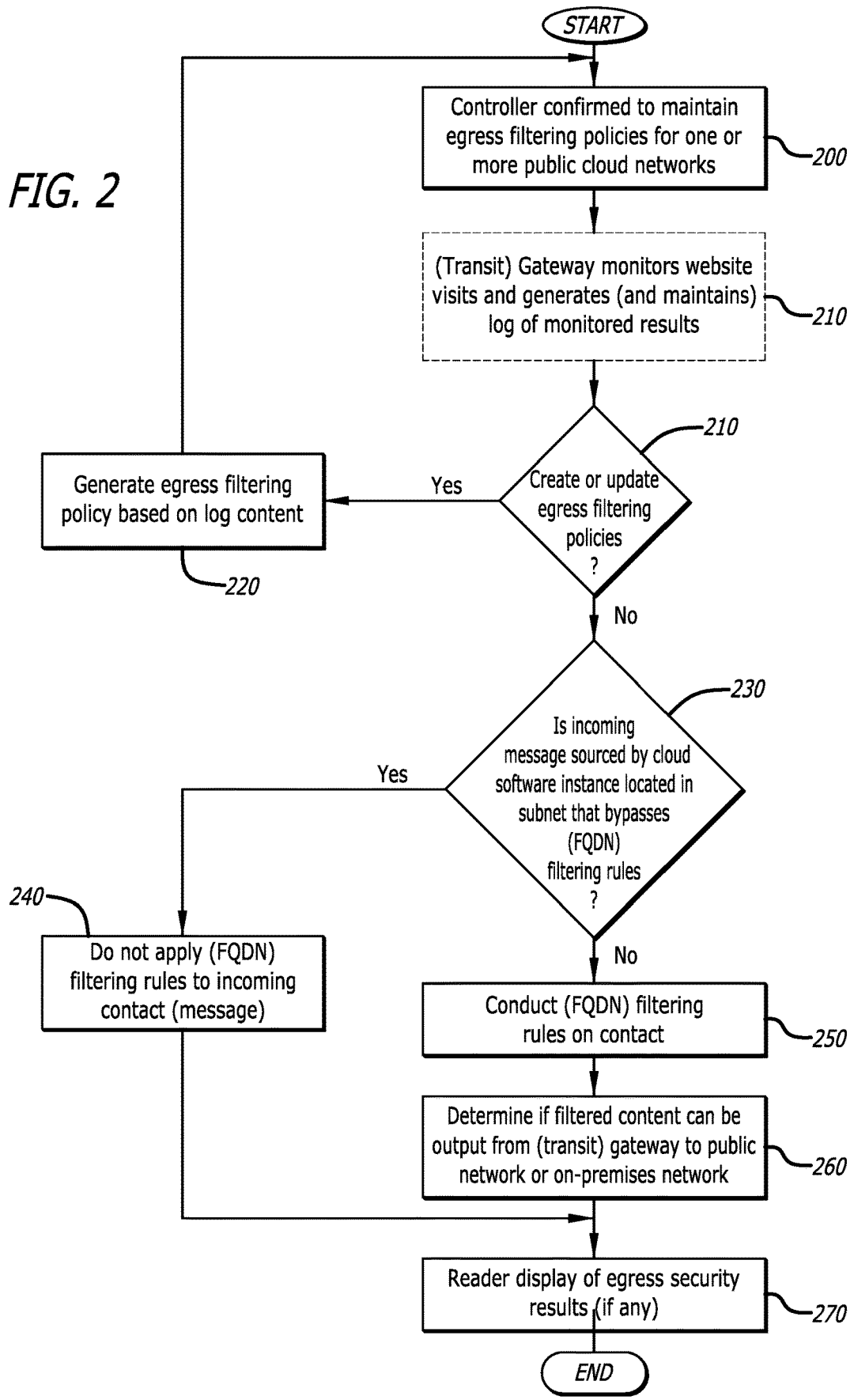
FIG. 2 is an exemplary embodiment of the operations conducted by the egress filtering components operating as part of the multi-cloud computing platform of FIG. 1.

Referring now to FIG. 2, an exemplary embodiment of the operations conducted by the egress filtering logic deployed within the multi-cloud computing platform of FIG. 1 is shown. For this embodiment, the operations are directed to egress filtering logic deployed within and operating with a transit gateway 132 of the transit VPC 130 of FIG. 1.

Herein, the controller is configured to maintain egress filtering policies for one or more public cloud networks, and in particular, one or more transit gateways deployed within a corresponding public cloud gateway (operation 200). Each egress filtering policy may be configured in accordance with a FQDN egress filtering solution. According to one embodiment of the disclosure, the egress filtering policy may be formulated by placing a VPC or its corresponding gateway(s) (e.g., one or more transit gateways, one or more spoke gateways, etc.) into a Discovery Mode.

In Discovery mode, each gateway is configured to monitor and maintain a log of what Internet sites certain cloud application instances visit before filtering policies are created (operation 210). This gives egress traffic visibility without disrupting the existing security policies and controls. The monitored results can be exported and analyzed to generate fine grained FQDN filtering rules associated with egress filtering policies (operation 220). Centrally managed groups of white listed domains may be used to allow for egress filtering policies to be applied easily in deployment workflows. FQDN "white" lists ensures that only trusted sites are accessible, thereby reducing the risk of a cyberattack.

Upon receipt of egress data traffic, namely one or more messages for transmission to the Internet or on-premises network, a determination is made whether the message is sourced by a cloud software instance located in a subnet that is configured to bypass FQDN filtering rules (operation 230). If so, the data traffic proceeds as egress traffic without any FQDN filtering (operation 240). However, if the message(s) are sourced by a cloud software instance without a bypass condition, FQDN filtering rules are conducted on the content of the message to determine whether the message(s) can continue to the Internet or on-premises network or whether the message(s) are blocked from transmission (operations 250 and 260). Herein, the data traffic may be subjected to corporate or regulatory compliance, such as PCI.

The FQDN filtering may provide visibility (e.g., dashboard) based on egress security results maintained as a log of permitted/blocked content (operation 270). Such visibility may be needed to prove compliance based on an audit of system operations and ensure best practices by at least limiting cloud software instance communications to only known Internet-based services. For example, cloud software application services may require access to a known domain name (github.com) or domain path with "wild card" support (e.g., use of wild card symbol "*" such as "*github.com" permits all secondary domains and other subdomains with the ending term "github"), but all other access should be filtered and blocked. Stated differently, this visibility enables users to understand what Internet-based services applications are communicating with other services applications, and provides the VPC with control to filter (e.g., FQDN filtering) of those communications.

The egress (FQDN) filtering solution is extremely flexible and can be deployed in different ways based on business and technical requirements. Stated differently, it is a low friction solution that fits easily in existing processes without requiring significant modifications to the existing cloud provisioning workflows. For illustrative purposes, four different egress filtering deployments are shown in FIGS. 3-7 and described herein, where each of these deployments utilizes gateways to provide network address translation for the egress data traffic and FQDN filtering for VPC egress, especially to the Internet.

Figure 3A:
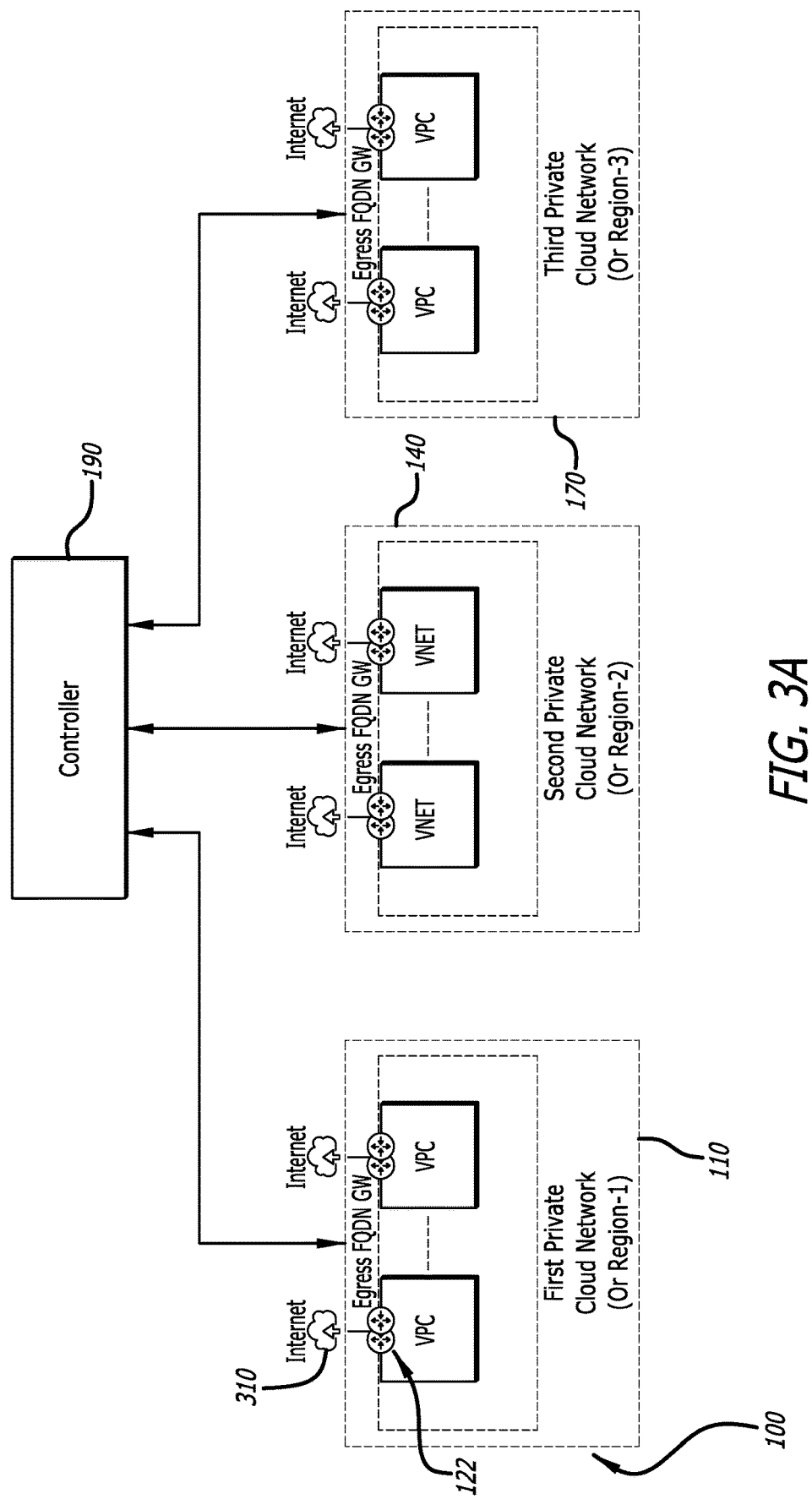
FIG. 3A is a first exemplary embodiment of local egress filtering components that support the multi-cloud computing platform of FIG. 1.
Figure 3B:
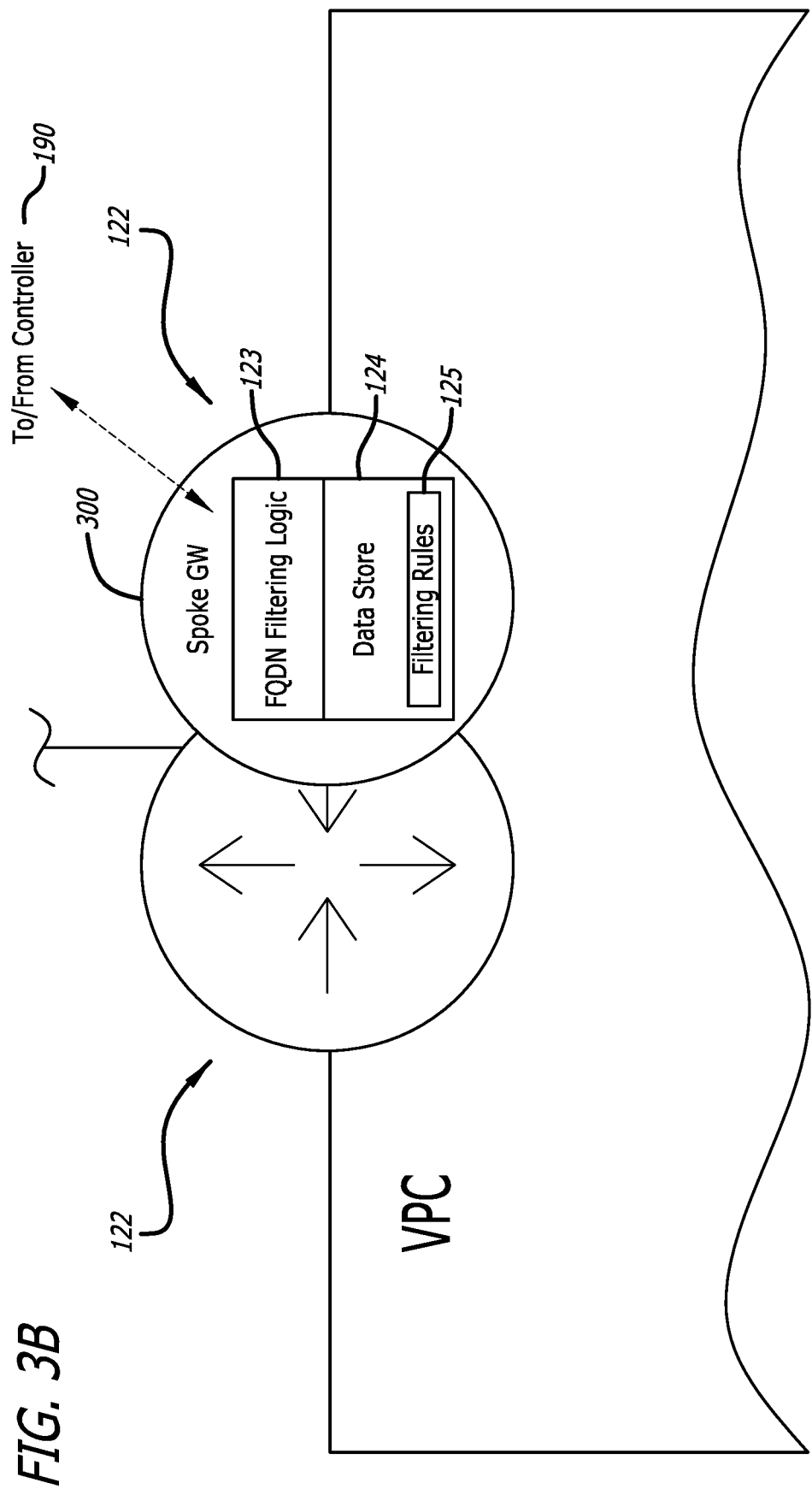
FIG. 3B is a detailed embodiment of a spoke gateway configured with FQDN filtering logic to restrict network access for certain resources.

Referring to FIGS. 3A-3B, a first exemplary embodiment of local egress filtering components that support the multi-cloud computing platform 100 of FIG. 1 is shown. Herein, local egress FQDN filtering is represented for the first public cloud network 110, although the same logical architecture may be deployed for any of the public cloud networks 110/140/170. According to this embodiment, each of the spoke gateways 122 is configured with FQDN filtering logic 123, where each VPC 120 (sometime referred to as a "tenant") is isolated from traffic flow with other VPCs (or public cloud networks) and may have unique filtering requirements. The filtering requirements may be due to the type of content (e.g. cloud software applications, etc.) accessible via the spoke gateways 122.

As shown in more detail, the communication scheme involves a first spoke gateway 300 of the spoke gateways 122 being configured to include the FQDN filtering logic 123 to restrict communications with certain resources on the Internet 310 in accordance with the FQDN filtering rules 125. In accordance with this deployment, the operability of the FQDN filtering logic 123 is automated by the controller 190 of FIG. 1, where the FQDN filtering rules 125 are maintained with the data store 124 accessible by the FQDN filtering logic 123. The FQDN filtering logic 123 may be further configured to include the subnet pass-through function 199 as shown in FIG. 3B, which allows for messages associated with one or more selected subnets in the VPC to bypass any FQDN filtering rules 125. The bypass may be based on a subnet name comparison, an address range determination, or the like to confirm that a message is received from or directed to the selected subnet(s) to bypass application of the filtering rules 125. The controller 190 is configured to handle route updates associated with the spoke VPC 120 as well as manage access to certain egress data traffic.

Herein, as shown in FIG. 3A, at least two spoke gateways 122 are provisioned, each in separate availability zones for service high availability and redundancy. These egress FQDN filtering gateways 122 are deployed in active/active mode (e.g., both of the spoke gateways 122 are active) to deliver optimized throughput performance. All management is done from the centralized controller 190 and the FQDN rule creation and application is policy based, as described above.

Figure 4:
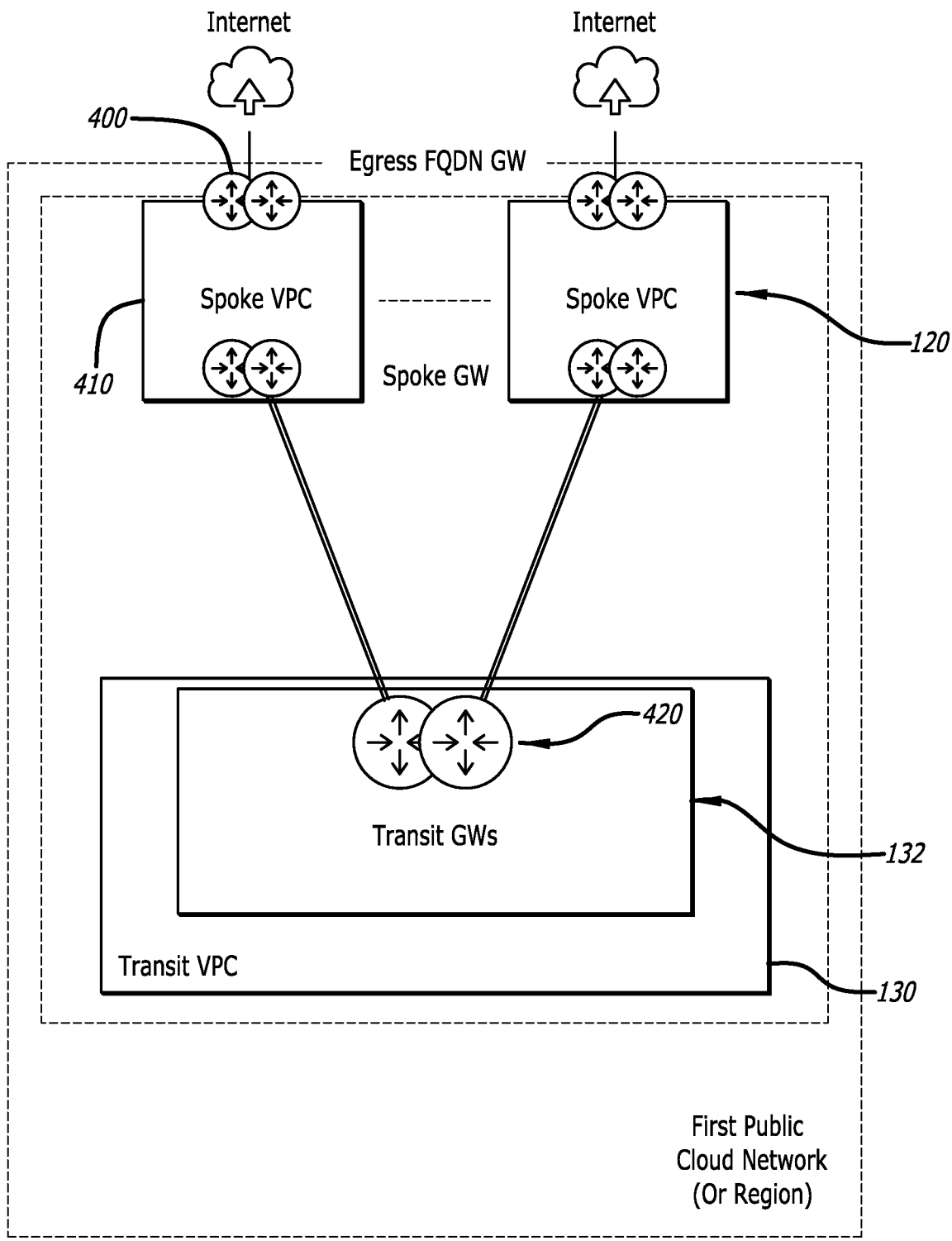
FIG. 4 is a second exemplary embodiment of local egress filtering components that support the multi-cloud computing platform of FIG. 1.

Referring now to FIG. 4, a second exemplary embodiment of local egress filtering components that support the multi-cloud computing platform of FIG. 1 is shown. Herein, a set of egress filtering gateways 400 (e.g., gateway with FQDN filtering logic controlled by FQDN filtering rules) is deployed in one or more of the spoke VPCs 120 of FIG. 1 (e.g., spoke VPC 410), where the egress filtering is required. As shown, each of the first set of egress filtering gateways 400 is communicatively coupled each transit gateway of the set of transit gateways 420 deployed in the transit VPC 130. Herein, egress filtering is handled by the egress filtering gateways 400 while the transit gateways 420 support communications between different spoke VPCs 410, which may reside within the same region or different regions of the same public cloud network or within different public cloud networks.

Herein, the combination the spoke VPC 410 including egress filtering gateways 400 adapted for communication with a transit VPC (e.g., transit VPC 130) forms the basic building block for multi-cloud transit as shown in FIG. 5. Herein, managed by the controller 190, egress filtering gateways 400 associated with the spoke VPC 400 for the first public cloud network 110 imposes filter criteria on egress data traffic directed to the Internet 310. Similarly, both egress filtering gateways 500 associated with the spoke VPC 150 for the second public cloud network 140 and egress filtering gateways 520 associated with the spoke VPC 180 for the third public cloud network 170 impose filter criteria on egress data traffic directed to the Internet 310. Communications between these spoke VPCs 120/150/180 via transit VPCs 130/160/185 allow for different filtering restrictions to be programmed for different VPCs along with visibility and control to guide communications to different VPCs depending on filtering rules (e.g., an administrator can direct guests and lower level employees to more restrictive FQDN filtering rules while higher level employees may be directed to another public cloud network with less restrictive FQDN filtering rules.

Referring to FIG. 6, a first exemplary embodiment of centralized egress filtering components that support the multi-cloud computing platform of FIG. 1 is shown. Herein, some of all of the transit gateways 132 and 162 of transit VPCs 130 and 160, such as egress filtered transit gateways 600 and 620, are deployed as egress filtering gateways. In particular, the transit gateways 132 and 162 are configured to perform FQDN filtering on egress data traffic, notably messages transmitted to the Internet. This deployment provides both scale-up and scale-out functionality, depending on throughput requirements. Organizations can increase the number of cloud software instances utilized or increase the number of egress filtering gateways directly from the controller 190.

Referring now to FIG. 7, a second exemplary embodiment of centralized egress filtering components that support the multi-cloud computing platform 100 of FIG. 1 is shown. This deployed is mainly applicable to (i) organizations that are already using AWS Transit Gateway 700 and due to internal policies or strategy are not willing or able to migrate to transit VPC-based design or (ii) organizations that utilize only a single public cloud network such as AWS cloud network for example. This logical architecture cannot be repeated across multiple clouds due to its dependency on the native AWS Transit Gateway service, but can be repeated across multiple, different regions of the AWS public cloud network through coupled transit VPCs associated with these different regions.

Herein, the controller (not shown) provides centralized deployment, management and control for AWS Transit Gateway 700 and connected VPCs (e.g., spoke VPCs 120, transit VPCs 130). All necessary routes and security policies in the application VPC, AWS Transit Gateway, and egress filtering gateways are automatically programmed, managed and controlled by the controller 190. Each of the transit gateways 720 is a multi-purpose service node that can perform various functionality such as high-availability and load balancing for egress filtering gateways located within the transit VPC 130. This deployment also provides both scale-up and scale-out functionality, depending on throughput requirements. Organizations can increase the number of cloud software instances utilized or increase the number of egress filtering gateways directly from the controller.

Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:
1. A computing platform, comprising:
a controller;
a first virtual private cloud network communicatively coupled to the controller, the first virtual private cloud network includes at least a first gateway including egress filtering logic that conducts Fully Qualified Domain Name (FQDN) filtering that either (i) permits messages with selected destination host names identified in a first set of filtering rules of the first gateway to pass or (ii) precludes messages with a second plurality of destination host names from being output from the gateway and permitting all other messages with destination host names other than the second plurality of destination host names to pass, and wherein, responsive to the FQDN filtering, the controller is configured to display egress security results associated with the FQDN filtering by the first gateway on a dashboard.

2. The computing platform of claim 1, operating as a multi-cloud computing platform that comprises the first virtual private cloud network being deployed within a first public cloud network and the second virtual private cloud network being deployed within a second public cloud network that is different from the first public cloud network.

3. The computing platform of claim 1, wherein the controller is configured with access to one or more routing data stores including the first set of filtering rules being used by the egress filtering logic.

4. The computing platform of claim 1, further comprising a second virtual private cloud network communicatively coupled to the controller, the second virtual private cloud network comprising a second gateway that include egress filtering logic that conducts Fully Qualified Domain Name (FQDN) filtering that either (i) permits messages with selected destination host names identified in a second set of filtering rules of the second gateway to pass or (ii) precludes messages with a third plurality of destination host names from being output from the gateway and permitting all other messages with destination host names other than the third plurality of destination host names to pass.

5. The computing platform of claim 4, wherein the first virtual private cloud network corresponds to a transit virtual private cloud network and the second virtual private cloud network corresponds to a spoke virtual private cloud network to provide a layered, successive egress filtering of a message from a source cloud software instance within a first subnetwork of one or more selected subnetworks to a destination cloud software instance.

6. A non-transitory storage medium configured to store at least a first gateway that provides communicative coupling between a source and a destination over one or more private cloud networks, the first gateway comprising:
   a first set of filtering rules for a first private cloud network and a second set of filtering rules for a second private cloud network included as part of a data store;
   egress filtering logic that conducts Fully Qualified Domain Name (FQDN) filtering that either (i) permits messages with selected destination host names identified in a first set of filtering rules of the first gateway to pass or (ii) precludes messages with a second plurality of destination host names from being output from the gateway and permitting all other messages with destination host names other than the second plurality of destination host names to pass, and
   wherein, responsive to the FQDN filtering, a controller of the first gateway is configured to display egress security results associated with the FQDN filtering by the first gateway on a dashboard.

7. The non-transitory storage medium of claim 6, wherein the egress filtering logic is further configured to determine whether the message is directed to or originated from a first subnetwork, and upon determining that the message is directed to or originated from the first subnetwork, bypassing the filtering of the message.

8. The non-transitory storage medium of claim 6, wherein the gateway is software communicatively coupled to a controller configured with access to modify the first set of filtering rules being used by the egress filtering logic.

9. A computerized method for filtering network traffic within a multi-cloud network, comprising:
   determining whether an incoming message is sourced by a software instance located within a first subnetwork or a second subnetwork,
   responsive to determining that the incoming message is sourced by a software instance outside of the first subnetwork, filtering the incoming message routed from a first gateway in accordance with a first set of filtering rules maintained by the first gateway;
   responsive to determining that the incoming message is sourced by a software instance outside of the second subnetwork, filtering the incoming message routed from a second gateway in accordance with a second set of filtering rules maintained by the second gateway; and
   responsive to determining that the incoming message is sourced by the software instance located within the first subnetwork, bypassing the filtering of the incoming message,
   wherein egress filtering logic conducts Fully Qualified Domain Name (FQDN) filtering that either (i) permits messages with selected destination host names identified in the first set of filtering rules to pass or (ii) precludes messages with a second plurality of destination host names from being output from the gateway and permitting all other messages with destination host names other than the second plurality of destination host names to pass, and
   responsive to the FQDN filtering, displaying on a dashboard egress security results associated with the FQDN filtering.

10. The computerized method of claim 9, wherein the software instance comprises a cloud software instance.

* * * * *